United States Patent
Stratton et al.

(10) Patent No.: US 6,570,531 B1
(45) Date of Patent: May 27, 2003

(54) SATELLITE NAVIGATION RECEIVER DESIGNED FOR COMPATIBILITY WITH AIRCRAFT AUTOMATIC LANDING SYSTEMS

(75) Inventors: D. Alexander Stratton, Cedar Rapids; Daryl L. McCall, Springville; James M. Wolff, Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/560,291

(22) Filed: Apr. 27, 2000

(51) Int. Cl.[7] .............................. G01S 5/02; H04B 7/185
(52) U.S. Cl. ................. 342/357.06; 342/411; 342/413; 701/215
(58) Field of Search .......................... 342/357.06, 410, 342/411, 413; 701/215

(56) References Cited

U.S. PATENT DOCUMENTS 5,702,070 A * 12/1997 Waid ........................ 244/183
5,936,571 A * 8/1999 Desjardins \* cited by examiner

*Primary Examiner*—Theodore M. Blum
(74) *Attorney, Agent, or Firm*—Nathan O. Jensen; Kyle Eppele

(57) ABSTRACT

A satellite navigational receiver landing system having retrofit compatibility with integrated landing system (ILS) receivers, in accordance with the invention, includes radio frequency circuitry which converts satellite signals into intermediate signals. A first processing channel coupled to the radio frequency circuitry generates a first position, velocity and time (PVT) solution as a function of the intermediate signals, and provides a PVT data output. A second processing channel coupled to the radio frequency circuitry generates a second PVT solution as a function of the intermediate signals. Monitor circuitry provides monitor output signals as a function of the first and second PVT solutions. Shutdown circuitry provides the first PVT solution to the PVT data output under the control of a shutdown signal from the monitor circuitry.

20 Claims, 2 Drawing Sheets

SATELLITE NAVIGATION RECEIVER DESIGNED FOR COMPATIBILITY WITH AIRCRAFT AUTOMATIC LANDING SYSTEMS

FIELD OF THE INVENTION

The present invention relates to satellite navigation systems. More particularly, the present invention relates to satellite navigation receivers and systems adapted for use in automatic landing of aircraft.

BACKGROUND OF THE INVENTION

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency $f_{L1}$ of 1575.42 MHz, and an L2 signal having a frequency $f_{L2}$ of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. Additional satellite measurements can be used to improve the position solution.

Modern aircraft are equipped with guidance equipment to enable automatic landings in low-visibility conditions. The equipment, which generates deviations from a defined path based on signals received from terrestrial radio-navigation aids, must be designed to ensure that it is extremely improbable that it provides misleading guidance data (i.e., the equipment must have high integrity). Stringent integrity requirements can be met with monitoring of receiver performance. These monitoring functions must detect faults that could cause misleading information while providing a low false alarm rate (i.e., high continuity).

The typical accuracy of satellite navigation systems is comparable to terrestrial radio-navigation systems. However, current satellite navigation receivers do not meet the stringent integrity and continuity requirements necessary for incorporation into aircraft automatic landing systems.

SUMMARY OF THE INVENTION

A satellite navigational receiver landing system having retrofit compatibility with integrated landing system (ILS) receivers, in accordance with the invention, includes radio frequency circuitry which converts satellite signals into intermediate signals. A first processing channel coupled to the radio frequency circuitry generates a first position, velocity and time (PVT) solution as a function of the intermediate signals, and provides a PVT and guidance data output. A second processing channel coupled to the radio frequency circuitry generates a second PVT and guidance solution as a function of the intermediate signals. Monitor circuitry provides monitor output signals as a function of the first and second PVT and guidance solutions. Shutdown circuitry provides the first PVT and guidance solution to the PVT and guidance data output under the control of a shutdown signal from the monitor circuitry. Monitoring functions ensure PVT and guidance accuracy is maintained within specified limits.

DETAILED DESCRIPTION OF AN ILLUSTRATIVE EMBODIMENT

Figure 1:
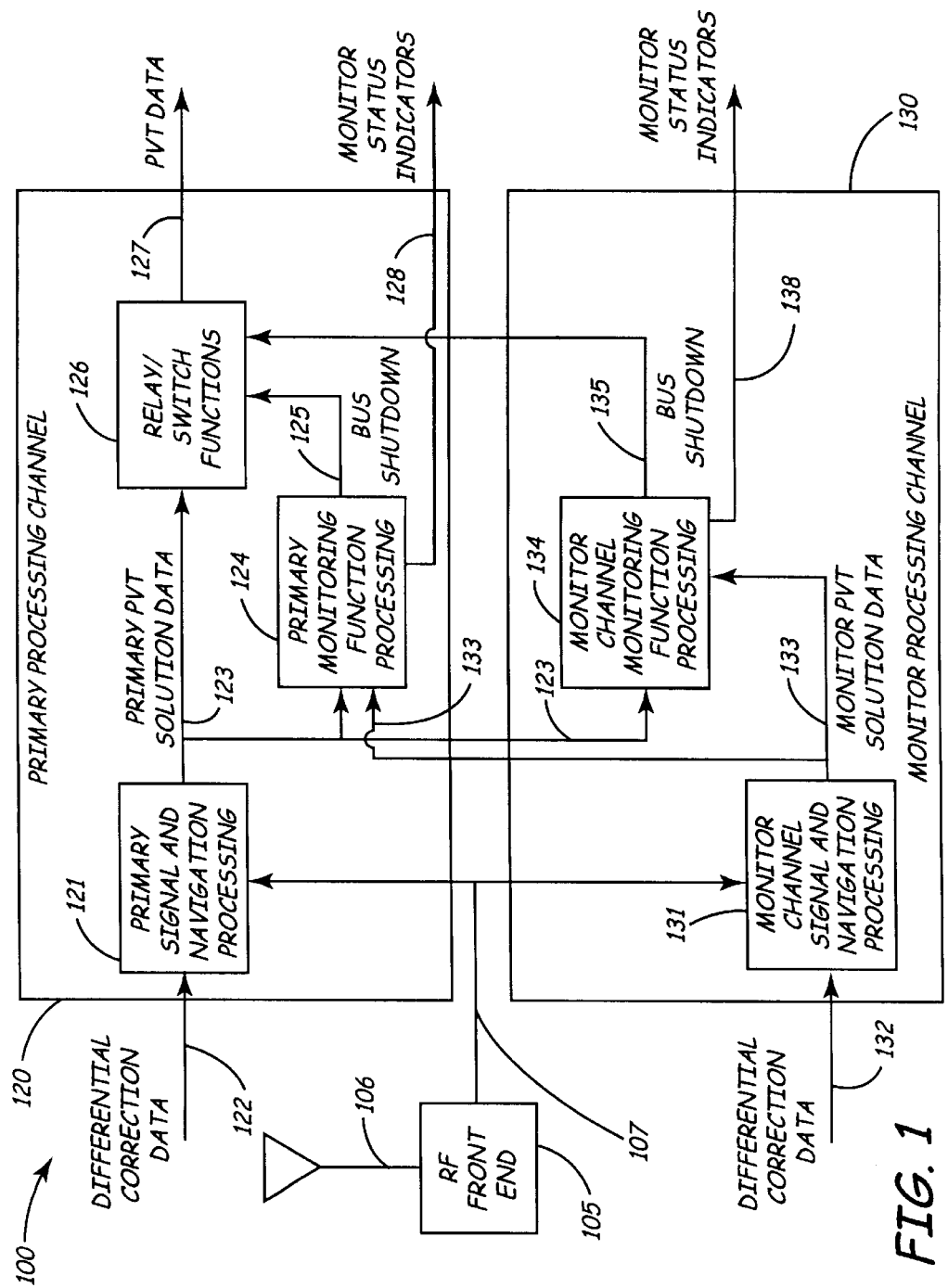
FIG. 1 is a block diagram illustrating a satellite navigation system receiver in accordance with an illustrative embodiment of the invention.
Figure 2:
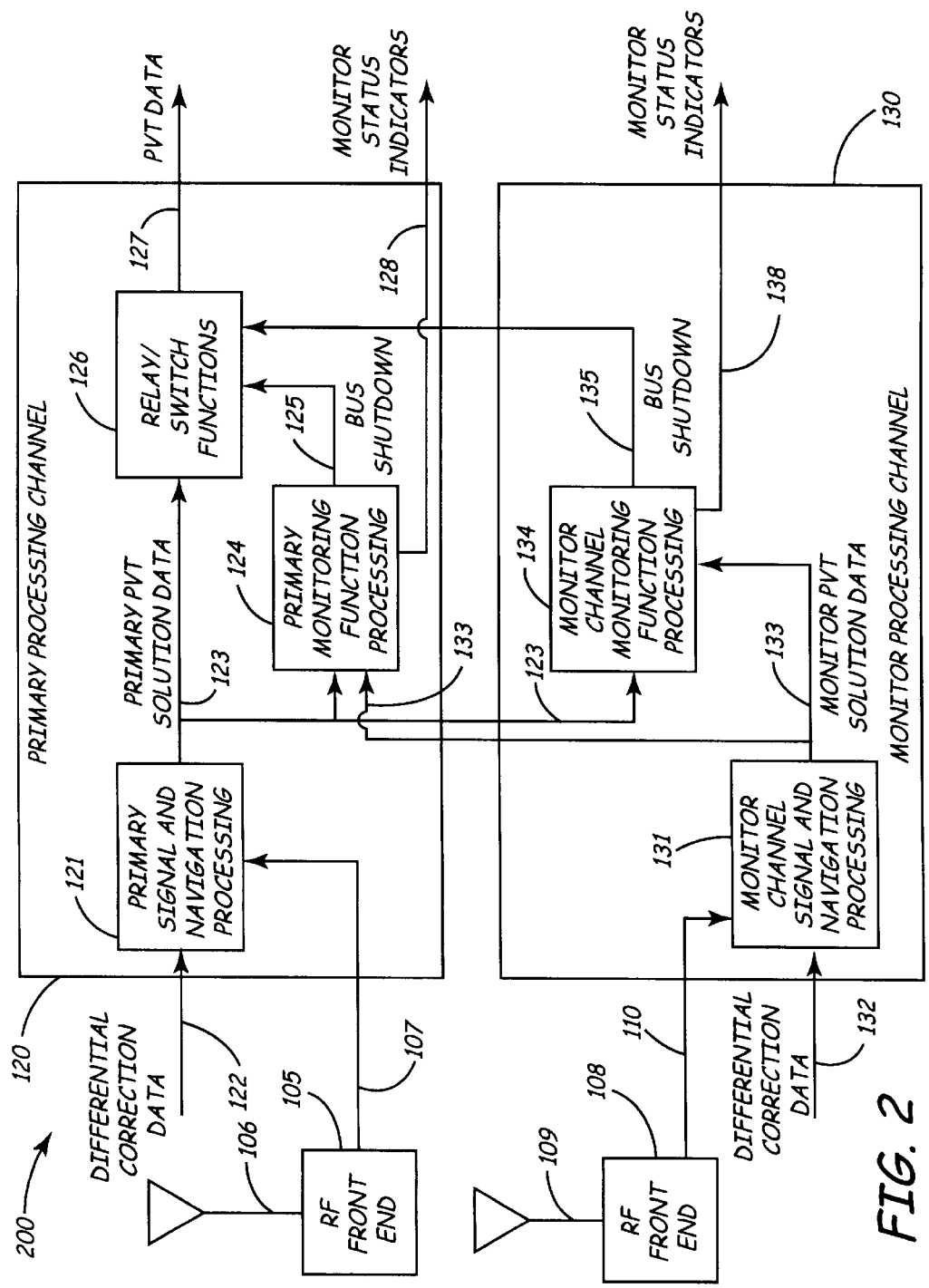
FIG. 2 is a block diagram illustrating a satellite navigation system receiver in accordance with an alternative illustrative embodiment of the invention.

FIGS. 1 and 2 are block diagrams that diagrammatically illustrate satellite navigation receivers 100 and 200 in accordance with exemplary embodiments of the present invention. Referring to FIG. 1, receiver 100 includes radio frequency (RF) front end circuitry 105, antenna 106, primary processing channel 120 and monitor processing channel 130.

Antenna 106 can be an antenna array or other devices adapted to receive satellite signals transmitted from multiple GNSS satellites (not shown) such as the satellites in the GPS or GLONASS constellations. Radio frequency circuitry 105 is coupled to antenna 106 and is adapted to convert the satellite signals into intermediate signals 107. Typically, conversion of the satellite signals by RF circuitry 105 will include conversion of the satellite signals from an L-band frequency to a lower intermediate frequency. However, conversion of the satellite signals preserves the positioning information obtained in the unconverted satellite signals. In an exemplary embodiment, intermediate signals 107 are indicative of information such as in-phase and quadrature power levels. Intermediate signals 107 can be digital data steams or digitally modulated analog signals.

Primary processing channel 120 and monitor processing channel 130 provide redundant signal processing and navigation processing functions to utilize the positioning information from the intermediate signals 107. A high degree of physical and electrical isolation is maintained between the processing threads provided by channels 120 and 130 to prevent fault propagation from one to the other.

Primary processing channel 120 includes primary signal processing and navigation processing functions 121, primary channel monitoring function processing 124 and relay/switch functions 126. The primary signal processing and navigation processing functions 121 can be implemented in separate processors or in a single processor programmed to implement both types of functions. The primary signal processing and navigation processing functions 121 utilize intermediate signals 107 from the RF section 105 and (optionally) differential correction data 122 to generate primary position, velocity and time (PVT) solution data 123. Differential corrections are code pseudorange error estimates generated for each satellite by one or more reference receivers at fixed known locations. The differential corrections may be applied to the code pseudoranges to reduce residual errors in the signals. Methods of generating primary PVT data 123 in this manner are well known in the art.

The primary PVT solution data 123 is a navigation output that includes, for example, position information and/or deviation guidance from a defined flight path. Primary PVT solution and deviation guidance data 123 is provided to relay/switch functions 126 and to primary monitoring function processing circuitry 124. Primary PVT solution and deviation guidance data 123 is also cross-fed into monitor channel monitoring function processing circuitry 134 within monitor processing channel 130 as will be discussed below. Relay/switch functions 126 can be implemented using relay/switch hardware and/or software executed within the primary navigation processor 121 or other processor. Likewise, primary channel monitor processing functions 124 can be implemented in the primary navigation processor 121 or in other processors.

Like primary processing channel 120, monitor processing channel 130 includes monitor channel signal processing and navigation processing functions 131 and monitor channel monitoring function processing 134. The monitor channel signal processing and navigation processing functions 131 can once again be implemented using separate signal and navigation processors, or within a single processor. As in processing channel 120, monitor channel signal and navigation processing functions 131 utilize intermediate signals 107 and (optionally) external differential correction data 132 to generate monitor PVT solution and deviation guidance data 133 that is fed into monitor channel monitoring function processor 134, and that is cross-fed into primary channel monitoring function processor 124 of primary processing channel 120. Receiver 200 illustrated in FIG. 2 differs from receiver 100 only in that it further includes (optionally) separate RF front end circuitry 108 and separate antenna 109 providing intermediate data 110 for use by processor 131.

Primary channel monitoring function 124 and monitor channel monitoring function 134 executed within primary processing channel 120 and monitor processing channel 130, respectively, each implement a fault detection scheme utilizing both primary PVT solution and deviation guidance data 123 and monitor PVT solution and deviation guidance data 133. The fault detection schemes maintain a position error within specified limits regardless of normal accuracy variations due to, for example, varying satellite geometry and the presence or absence of augmentation sources such as differential correction data from a ground based or other source, or data from other aircraft sensors. Robustness against normal accuracy variations is achieved by constructing conservative error bounds, referred to as protection levels, which are based on comparisons of primary and monitor-channel PVT solution data 123 and 133, accounting for known sources of accuracy variations.

Processors implementing the primary channel monitoring function 124 and monitor channel monitoring function 134 provide bus shutdown signals (125 and 135, respectively) for controlling relays 126 that shut down an output PVT data signal 127 if a critical fault is detected. Monitoring functions of the current invention achieve improved fault-detection reliability by adapting the detection methods based on the known sources of accuracy variations. Each of the monitoring functions 124 and 134 also provide a monitor status indicator (128 and 138, respectively) that contain information indicative of the status of the PVT output data 127. PVT output data 127, as well as monitor status indicators 128 and 138 can be provided to other avionics systems for use in automatic landing or other aircraft functions.

GNSS Navigation receivers used in safety-critical applications typically output real-time error bounds or protection levels that account for a possible satellite malfunction on the PVT solution data 123. These error-bound outputs can be used by external equipment to ensure that the navigation accuracy is sufficient for a particular procedure (e.g., non-precision approach) even if a latent satellite fault is in progress. Monitoring functions 124 and 134 of the present invention adapt these error-bound outputs to account for possible internal malfunction in the GNSS receiver 100. Monitoring functions 124 and 134 of the present invention also include the monitoring of the error-bound outputs 123 and 133.

The monitoring methods implemented by primary channel monitoring processor 124 and monitor channel monitoring processor 134 can include the following steps. First, differences between primary channel PVT solution data 123 and monitor channel PVT solution data 133 are scaled to form a position-based residual. This scaling can include, for example, converting data from a latitude and longitude format into a positional difference in, for example, meters. Next, the residual is used to formulate a conservative error bound (protection level). Protection levels may be formulated for all the various GNSS receiver 100 output parameters such as horizontal and vertical position, velocity, and lateral and vertical deviation as will be shown by example below. The protection level is formulated as a statistical confidence limit of the output error, which is valid under the hypothesis of an internal GNSS receiver 100 fault. The degree of statistical confidence is based on a required probability of missed detection, which is typically derived from a fault hazard assessment. If the error bound exceeds operational limits (i.e., if the geometry is considered inadequate to support the required integrity), the primary PVT solution and deviation guidance output 123 and PVT data 127 are invalidated and the relevant monitor 124,134 generates a status indicator 128,138 providing a "No Computed Data" warning. If the residual itself is statistically improbable (based on an adaptable threshold accounting for known accuracy variations), the relevant monitor declares a hard fault and indicates on status indicators 128,138 a "Fail Warning". If the primary channel 120 does not provide the required indications (error bound exceeds operational limits or residual is statistically improbable as described above), the monitors 124 and 134 shut down the outputs via relays 126 and bus shut down signals 125,135. The protection levels associated an with internal GNSS receiver 100 fault described above are compared to the protection levels associated with satellite fault, and the greater of the two is output. The monitors 124 and 134 also activate failure indications on the status indicators 128 and 138 if the protection level outputs from the primary channel 120 are excessively small.

The primary and monitor channels monitor function processing 124 and 134 may monitor primary and monitor PVT solution and deviation data outputs 123 and 133 using the following logic which is consistent with ARINC 429 standard for digital communications. Using this standard [as an exemplary embodiment], there may be four possible integrity monitoring states on monitor status indicator outputs 128,138: a NORMAL (NORM) state; a TEST state; the NO COMPUTED DATA (NCD) state; and the FAIL WARN state, which is a fault state. These particular monitoring states are provided as examples, and are not intended to limit the invention to embodiments utilizing these specific states.

A sign/status matrix (SSM) of the monitor status indicator output 128 from the primary channel monitoring processing function 124 is linked to a SSM of the monitor status indicator outputs 128 of the monitor processing channel 130, so that if the monitor processing channel 130 is in acquisition, aided, or self-test modes, the primary channel monitor processing function 124 sets all monitor status SSM to NCD. Similarly, if the monitor channel 130 SSM are FAIL, then the primary channel 120 sets its monitor status indicator output 128 to FAIL.

The monitor channel monitoring processor 134 provides an assurance that the primary channel 120 is maintaining the linkage between the primary channel 120 and monitor channel 130. If monitor channel monitoring processor 134 detects that the primary channel 120 is outputting navigation data with any integrity labels NORM while the monitor channel 130 is in acquisition, aided, or self-test modes, or in a faulted state, the monitor channel monitoring function 134 declares a critical fault and activates bus shut-down circuitry 126 if required.

The primary channel 120 computes protection levels that are valid error bounds under the condition of a latent fault corrupting the PVT data output 127. As an example for each set of monitor PVT data 133 provided by the monitor channel processor 131, the primary channel monitor processor 124 computes a Horizontal Dual-Thread Protection Level (HDPL) (for example computed using Equation 1) and outputs the greater of a horizontal integrity limit (HIL) and the HDPL:

$$\text{HDPL}=\Delta[\lambda_D,\phi_D,\lambda_M,\phi_M]+K\sigma_{HM} \qquad (1)$$

where $\lambda_M$ and $\phi_M$ are respectively a longitude and a latitude represented by the monitor PVT solution 133, where $\lambda_D$ and $\phi_D$ are respectively a longitude and latitude represented by the primary PVT solution 123, where the function $\Delta[\lambda_D, \phi_D, \lambda_M, \phi_M]$ represents the distance between $\lambda_D$ and $\phi_D$ and $\lambda_M$ and $\phi_M$, where $\sigma_{HM}$ is a conservative estimate of the standard deviation of the error of the monitor PVT solution 133, and where K is a multiplicative factor chosen to yield a desired probability of missed detection.

Similar protection limit functions may be calculated for the vertical position outputs, the velocity outputs, and the time outputs. Modifications for the use of airborne and ground-based augmentations are straightforward in view of this disclosure.

The monitor channel monitoring processor 134 provides assurance that the primary channel 120 is providing a valid protection level output HDPL. Continuing the example described above, for each set of PVT data 123 provided by the primary channel processor 121, the monitor channel monitoring processor 134 computes a Horizontal Dual-Thread Protection Limit Monitor (HDPL$_M$), (for example using Equation 2), and verifies that the primary channel's integrity label outputs on monitor status indicator 128 bound the monitor channel's HDPL$_M$. If the primary channel's HDPL is less than the monitor's HDPL$_M$, the monitor channel 130 declares a critical fault and activates the shut-down circuitry 126.

$$\text{HDPL}_M=\Delta[\lambda_M(t_D),\phi_M(t_D),\lambda_D,\phi_D]+K\sigma_{HM} \qquad (2)$$

where $\lambda_M$ and $\phi_M$ are respectively a longitude and a latitude represented by the monitor PVT solution 133, where $\lambda_D$ and $\phi_D$ are respectively a longitude and latitude represented by the primary PVT solution 123, where the function $\Delta[\lambda_M(t_D), \phi_M(t_D),\lambda_D,\phi_D]$ represents the computed distance between $\lambda_M$ and $\phi_M$ and $\lambda_D$ and $\phi_D$ at the time $t_D$ that the $\lambda_D$ and $\phi_D$ measurements are made, where $\sigma_{HM}$ is a conservative estimate of the standard deviation of the error of the monitor PVT solution 133, and where K is a multiplicative factor chosen to yield a desired probability of missed detection.

Similar protection limit functions may be calculated for the vertical position outputs, the velocity outputs, and the time outputs. Modifications for the use of airborne and ground-based augmentations are straightforward in view of this disclosure.

Detection of erroneous PVT data 123 and 133 is based on the observance of an improbably large position-based residual or difference between the primary channel 120 and monitor channel 130 discussed above. For each set of PVT data 123 provided by the primary channel 120, the monitor channel monitoring function processor 134 evaluates a validity check on the PVT data 123, for example using the relationship of Equation 3. If the check fails, the monitor channel 130 declares a critical fault and activates the shut-down circuitry 126:

$$\Delta[\lambda_M,\phi_M,\lambda_D,\phi_D]\leq K_f\sigma_H \qquad (3)$$

where $\lambda_M$ and $\phi_M$ are respectively a longitude and a latitude represented by the monitor PVT solution 133, where $\lambda_D$ and $\phi_D$ are respectively a longitude and a latitude represented by the primary PVT solution 123, where the function $\Delta[\lambda_M, \phi_M, \lambda_D, \phi_D]$ represents the computed distance between $\lambda_M$ and $\phi_M$ and $\lambda_D$ and $\phi_D$ where $\sigma_H$ is a conservative estimate of the standard deviation of the position residual $\Delta$, and where $K_f$ is a multiplicative factor chosen to yield a desired probability of false alarm.

Similar validity check functions may be calculated for the vertical position outputs, the velocity outputs, and the time outputs. Modifications for the use of airborne and ground-based augmentations are straightforward in view of this disclosure. In addition, it is straightforward to add, to the illustrated embodiments, redundant cross-monitoring functions to the drive-channel similar to those described for the monitor channel.

With reference to monitoring of the deviation outputs in the PVT solution and deviation guidance data 123 and 133, ARINC labels 173 (lateral deviation) and 174 (vertical deviation), monitor processors 124 and 134 may implement the logic described in the following paragraphs.

In this example, the SSM of the PVT solution and deviation data outputs 123 from the primary channel monitoring function 124 are linked to the SSM of the PVT solution and deviation outputs 133 of the monitor channel monitoring function 134, so that if the monitor processing channel 130 is setting the SSM of label 173 and 174 to NCD, the primary channel monitoring function 124 sets the SSM of label 173 and 174 to NCD. Similarly, if the monitor channel 130 SSM are FAIL, then the primary channel 120 sets its outputs to FAIL.

The monitor channel monitoring function 134 provides an assurance that the primary channel 120 is maintaining this linkage. If monitor channel monitoring processor 134 detects that the primary channel 120 is outputting deviation data with an SSM of NORM while the monitor channel 130 is setting its SSM to NCD or FAIL, the monitor channel monitoring processor 134 declares a critical fault and activates the shutdown circuitry 126.

In some embodiments of the invention, the hardware is adapted to accommodate or implement an output disable interrupt (ODI) capability. ODI is a customer specific feature that allows different faults to be treated differently in different avionics systems having different configurations. For example, when ODI is enabled, if the monitor channel monitoring processor 134 detects that the primary channel 120 is outputting lateral deviation (e.g., label 173) and/or vertical deviation (e.g., label 174) with SSM NORM for more than five seconds while the monitor 134 can not set the corresponding SSM's to NORM, the monitor 134 declares a critical fault and the monitors 124 and 134 shut down the outputs via relays 126 and control signals 125,135 until the condition no longer exists for a five-second period.

The primary channel 120 computes protection levels that are valid error bounds under the condition of a latent fault corrupting the deviation data output 127. As an example while the lateral and vertical deviation outputs from primary channel 120 are set to NORM, the primary channel monitoring processor 124 computes a Vertical Dual-Thread Protection Level (VDPL), as shown below in Equation 4. If the VDPL exceeds the operational limit for the application, the primary channel 120 transitions the deviation outputs 127 to an NCD status on the status monitor indicators 128 and 138.

$$VDPL \equiv |\Phi_D - \Phi_M| D_V \frac{\pi}{180} + K\sigma_{VM} \quad (4)$$

where $\Phi_D$ is the primary channel 120 angular vertical deviation output in degrees, where $\Phi_M$ is the monitor channel 130 angular vertical deviation output in degrees, where $D_v$ represents distance to the origin of the angular deviation, where $\sigma_{VM}$ is a conservative estimate of the standard deviation of the vertical (normal) position error associated with the monitor vertical deviation, and where K is a multiplicative factor chosen to yield a desired probability of missed detection.

Similar protection level functions may be calculated for the lateral guidance outputs. Modifications for the use of airborne and ground-based augmentations are straightforward in view of this disclosure.

The monitor channel monitoring function 134 provides assurance that the primary channel 120 is providing the VDPL monitoring function in this example. While the monitor channel 130 is in Approach Mode and monitor channel monitor processor 134 is receiving label 173 from the primary channel 120 with valid SSM, the monitor channel monitoring function 134 computes the Vertical Dual-thread Protection Level Monitor $VDPL_M$ using, for example the relationship shown in Equation 5. If $VDPL_M$ exceeds its operational limit, the monitor channel monitoring function 134 declares a critical fault and activates bus shut-down circuitry 126 if appropriate.

$$VDPL_M \equiv |\Phi_M - \Phi_D| D_V \frac{\pi}{180} + K\sigma_{VM} \quad (5)$$

where $\Phi_D$ is the primary channel angular vertical deviation output in degrees, where $\Phi_M$ is the monitor channel angular vertical deviation output in degrees, where $D_v$ represents distance to the origin of the angular deviation, where $\sigma_{VM}$ is a conservative estimate of the standard deviation of the vertical (normal) position error associated with the monitor vertical deviation, and where K is a multiplicative factor chosen to yield a desired probability of missed detection.

Similar protection limit functions may be calculated for the lateral guidance outputs. Modifications for the use of airborne and ground-based augmentations are straightforward in view of this disclosure.

Detection of erroneous deviation guidance data is based on the observance of an improbably large difference between the primary and monitor channel deviation outputs 123 and 133. As an example while the monitor channel 130 is in Approach Mode and receiving label 174 from the primary channel 120 with valid SSM, the monitor channel monitoring function 134 performs the validity check represented by Equation 6. If the check fails, the monitor channel monitoring function 134 sets the SSM of labels 173 and 174 to FWN.

$$|\Phi_D - \Phi_M| \frac{\pi}{180} D_V \geq K_f \sigma_v \quad (6)$$

where $\Phi_D$ is the primary channel angular vertical deviation output in degrees, where $\Phi_M$ is the monitor channel angular vertical deviation output in degrees, where $D_v$ represents distance to the origin of the angular deviation, where $\sigma_V$ is a conservative estimate of the standard deviation of the vertical (normal) position residual associated the vertical deviation differences, and where $K_f$ is a multiplicative factor chosen to yield a desired probability of false alarm.

Similar protection limit functions may be provided for the lateral guidance outputs. Modifications for the use of airborne and ground-based augmentations are straightforward in view of this disclosure.

Although the present invention has been described with reference to illustrative embodiments, workers skilled in the art will recognize that changes may be made in form and detail without departing from the spirit and scope of the invention.

What is claimed is:

1. A satellite navigation receiver landing system providing PVT output data, the satellite navigation receiver landing system comprising:

antenna means adapted to receive satellite signals transmitted from a plurality of satellites;

radio frequency circuitry coupled to the antenna means and adapted to convert the satellite signals into intermediate signals;

a primary processing channel coupled to the radio frequency circuitry and adapted to generate a primary position, velocity and time (PVT) solution as a function of the intermediate signals, the primary processing channel providing the PVT output data;

a monitor processing channel coupled to the radio frequency circuitry and adapted to generate a monitor PVT solution as a function of the intermediate signals;

a primary monitor function coupled to the primary and monitor processing channels and providing primary monitor output signals as a function of the primary and monitor PVT solutions, the primary monitor output signals including monitor status indicators and a shut-down signal to maintain a position error and to provide the shutdown signal when the position error is exceeded;

a monitor channel monitor function coupled to the primary and monitor processing channels and providing monitor channel monitor output signals as a function of the primary and monitor PVT solutions, the monitor channel monitor output signals including monitor status indicators and a shutdown signal to maintain a position error and to provide the shutdown signal when the position error is exceeded; and shutdown circuitry controllably providing the primary PVT solution to the PVT data output, wherein the shutdown circuitry provides the primary PVT solution to the PVT data output as a function of the shutdown signals.

2. The satellite navigation receiver landing system of claim 1, wherein the primary monitor function and the monitor channel monitor function are adapted to provide the monitor status indicators and the shutdown signals to maintain the position error within operational limits during changes in at least one of satellite geometry and of the presence of a source of augmentation data.

3. The satellite navigation receiver landing system of claim 2, wherein the system is adapted to maintain the position error within the operational limits by calculating primary channel and monitor channel protection levels that are an internal statistical confidence measure and are valid under an internal fault condition in one of the primary and monitor processing channels and are compared to the operational error limits.

4. The satellite navigation receiver of claim 3, wherein the calculated primary channel protection level is a horizontal dual-thread protection limit (HDPL) computed by the primary channel monitor using the relationship:

$$HDPL = \Delta[\lambda_D, \phi_D, \lambda_M, \phi_M] + K\sigma_{HM}$$

where $\lambda_M$ and $\phi_M$ are respectively a longitude and a latitude represented by the monitor PVT solution, where $\lambda_D$ and $\phi_D$ are respectively a longitude and latitude represented by the primary PVT solution, where the function $\Delta[\lambda_D, \phi_D, \lambda_M, \phi_M]$ represents the computed distance between $\lambda_D$ and $\lambda_D$ and $\lambda_M$ and $\phi_M$ where $\sigma_{HM}$ is a conservative estimate of the standard deviation of the error of the monitor PVT solution, and where K is multiplicative factor chosen to yield a desired probability of missed detection.

5. The satellite navigation landing system of claim 1, wherein the monitor channel monitor function is further adapted to detect erroneous PVT outputs from the primary PVT solution by computing cross channel residuals as a function of a difference between the primary PVT solution and the monitor PVT solution, and comparing the computed cross channel residuals to an adaptable threshold dependent upon known accuracy variations.

6. The satellite navigation receiver of claim 5, wherein the detection of erroneous PVT outputs includes a validity check of the form:

$$\Delta[\lambda_M, \phi_M, \lambda_D, \phi_D] \leq K_f \sigma_H$$

where $\lambda_M$ and $\phi_M$ are respectively a longitude and a latitude represented by the monitor PVT solution, where $\lambda_D$ and $\phi_D$ are respectively a longitude and a latitude represented by the primary PVT solution, where the function $\Delta[\lambda_M, \phi_M, \lambda_D, \phi_D]$ represents the computed distance between $\lambda_M$ and $\phi_M$ and $\lambda_D$ and $\phi_D$, where $\sigma_H$ is a conservative estimate of the standard deviation of the position residual $\Delta$, and where $K_f$ is a multiplicative factor chosen to yield a desired probability of false alarm.

7. The satellite navigation landing system receiver of claim 5, wherein the monitor channel monitor function declares a hard fault and indicates a Fail Warning on the monitor status indicator.

8. The satellite navigation receiver landing system of claim 3, wherein the monitor channel monitor function is adapted to verify that the monitor channel protection level is greater than the primary channel protection level associated with the primary PVT solution, and to declare a critical fault and to activate the shutdown circuitry if the monitor channel protection level is not greater.

9. The satellite navigation receiver landing system of claim 8, wherein the monitor channel protection level is a Horizontal Dual-Thread Protection Limit Monitor HDPLM and is determined using the relationship:

$$HDPL_M = \Delta[\lambda_M(t_D), \phi_M(t_D), \lambda_D, \phi_D] + K\sigma_{HM}$$

where $\lambda_M$ and $\phi_M$ are respectively a longitude and a latitude represented by the monitor PVT solution, where $\lambda_D$ and $\phi_D$ are respectively a longitude and latitude represented by the primary PVT solution, where the function $\Delta[\lambda_M(t_D), \phi_M(t_D), \lambda_D, \phi_D]$ represents the computed distance $\lambda_M$ and $\phi_M$ and $\lambda_D$ and $\phi_D$, where $\sigma_{HM}$ is a conservative estimate of the standard deviation of the error of the monitor PVT solution, and where K is a multiplicative factor chosen to yield a desired probability of missed detection.

10. A satellite navigation receiver having retrofit compatibility with integrated landing system (ILS) receivers providing vertical and lateral deviation guidance outputs, the satellite navigation receiver comprising:

antenna means adapted to receive satellite signals transmitted from a plurality of satellites;

radio frequency circuitry coupled to the antenna means and adapted to convert the satellite signals into intermediate signals;

a primary processing channel coupled to the radio frequency circuitry and adapted to generate a primary lateral and vertical guidance solution as a function of the intermediate signals, the primary processing channel providing lateral and vertical guidance data outputs;

a monitor processing channel coupled to the radio frequency circuitry and adapted to generate a monitor lateral and vertical guidance solution as a function of the intermediate signals;

monitor functions coupled to the primary and the monitor processing channels and having the primary lateral and vertical guidance solution and the monitor lateral and vertical guidance solution fed and cross fed into each monitor function and providing monitor output signals as function of the primary and monitor lateral and vertical guidance solutions, the monitor output signals including monitor status indicators and shutdown signals to maintain a position error and to provide the shutdown signals when the position error is exceeded; and shutdown circuitry controllably providing the primary lateral and vertical guidance solution to the lateral and vertical guidance output, wherein the shutdown circuitry provides the primary lateral and vertical guidance solution to the lateral and vertical guidance output as a function of the shutdown signal.

11. The satellite navigation receiver landing system of claim 10, wherein the monitor functions are adapted to provide the monitor status and the shutdown signal to maintain the position error within operational limits during changes in at least one of satellite geometry and of the presence of a source of augmentation data.

12. The satellite navigation receiver landing system of claim 11, wherein the monitor functions are adapted to maintain the position error within the operational limits by calculating primary channel and monitor channel protection levels that are an internal statistical confidence measure and are valid under an internal fault condition in one of the primary and monitor processing channels and by comparing the protection levels to the operational error limits.

13. The satellite navigation receiver landing system of claim 12, wherein the calculated protection level is a Vertical Dual-Thread Protection Level (VDPL) calculated using the relationship:

$$VDPL = |\Phi_D - \Phi_M| \pi/180 \, D_v + K\sigma_{vm}$$

where $\Phi_M$ is a vertical deviation in degrees of the monitor guidance solution, where $\Phi_D$ is a vertical deviation in degrees of the primary guidance solution, where $D_v$ is a computation of distance to a vertical deviation reference point for the primary guidance solution, where $\sigma_{vm}$ is a conservative estimate of the standard deviation of the error of the monitor guidance solution, and where K is a multiplicative factor chosen to yield a desired probability of missed detection.

14. The satellite navigation receiver of claim 10, wherein the monitor functions are further adapted to detect erroneous deviation guidance outputs by computing cross channel residuals as a function of a difference between the primary guidance solution and the monitor guidance solution, and comparing the computed cross channel residuals to a threshold that is dependent upon satellite geometry and the presence of augmentation data sources.

15. The satellite navigation receiver of claim 14, wherein the monitor functions are adapted to perform a validity check, and if the validity check fails, then to provide a fail warn indication on the monitor status indicator, wherein the validity check performed by the monitor functions use the relationship:

$$|\Phi_D - \Phi_M| \pi/180 D_V > K_f \sigma_v$$

where $\Phi_M$ is a vertical deviation in degrees of the monitor guidance solution, where $\Phi_D$ is a vertical deviation in degrees of the primary guidance solution, where $D_v$ is a computation of distance to a vertical deviation reference point for the primary guidance solution, where $\sigma_v$ is a conservative estimate of the standard deviation of the cross-channel residual, and where $K_f$ is a multiplicative factor chosen to yield a desired probability of false alarm.

16. The satellite navigation receiver of claim 10, wherein the intermediate signals provided by the radio frequency circuitry further comprise first intermediate signals provided to the primary processing channel and second intermediate frequency signals provided to the monitor processing channel.

17. A satellite navigation receiver landing system providing navigation outputs in the form of at least one of PVT solution and deviation guidance data and having monitor processing functions said satellite navigation receiver performing the steps of:

receiving with an antenna satellite signals transmitted from a plurality of navigation satellites;

converting the satellite signals to intermediate signals with radio frequency circuitry;

generating a primary navigation output as a function of the intermediate signals in a primary processing channel;

generating a monitor navigation output as a function of the intermediate signals in a monitor processing channel;

providing the primary navigation output to a primary monitor function in the primary processing channel;

cross feeding the primary navigation output into a monitor channel monitor function in the monitor channel;

providing the monitor navigation output into the monitor channel monitor function;

cross feeding the monitor navigation output into the primary monitor function;

subtracting the monitor navigation output from the primary navigation output in the primary monitor function;

scaling the difference between the monitor navigation output and the primary navigation output to form a position-based residual in the primary monitor function;

subtracting the primary navigation output from the monitor navigation output in the monitor channel monitor function;

scaling the difference between the primary navigation output and the monitor navigation output to form a position-based residual in the monitor channel monitor function;

formulating an error bound (protection level) as a statistical confidence limit of the output error in the primary processing channel; and formulating an error bound (protection level) as a statistical confidence limit of the output error in the monitor processing channel.

18. The method of claim 17 further comprising the steps of:

invalidating the guidance outputs if the error bounds in the primary or monitor processing channels exceed operational limits; and generating a status indicator No Computed Data warning in the primary channel monitor or the monitor channel monitor if the error bounds exceed operational limits.

19. The method of claim 17 further comprising the steps of:

comparing the position-based residual to an adaptable threshold that accounts for known accuracy variations in the primary processing channel monitor and the monitor processing channel monitor;

declaring a hard fault in the relevant monitor when the position-based residual exceeds the adaptable threshold; and indicating a fail warning on an appropriate monitor status indicator.

20. The method of claim 17 further comprising the steps of:

comparing the error bound to operational limits in the primary channel;

shutting down the navigation outputs with the monitor function via the shutdown function if the error bound exceeds the operational limits;

comparing the position-based residual to an adaptable threshold that accounts for known accuracy variations in the primary monitor function; and shutting down the navigation outputs with the primary monitor function via the shutdown function if the position-based residual exceeds the operational limits.

* * * * *